Jan. 1, 1963 J. WEICHBROD 3,071,160
FLUID RESTRICTOR FOR LINEAR FLOW METERS
Filed July 1, 1959

INVENTOR
JOSEPH WEICHBROD
BY Morris Fidelman
ATTORNEY

United States Patent Office 3,071,160
Patented Jan. 1, 1963

3,071,160
FLUID RESTRICTOR FOR LINEAR FLOW METERS
Joseph Weichbrod, Silver Spring, Md., assignor to National Instrument Laboratories, Inc., Washington, D.C., a corporation of Maryland
Filed July 1, 1959, Ser. No. 824,423
11 Claims. (Cl. 138—40)

This invention relates to measuring the rate of flow (or viscosity) of a fluid, whether gaseous or liquid, and more particularly to an improved linear flow meter.

The advantages of the linear type flow meter over those which operate on the Bernoulli principle (i.e., fixed orifices, nozzles, venturi tubes, variable orifices, etc.) are well known to those skilled in the art. However, all of the linear type flow meters heretofore known to me are characterized by certain disadvantages, including inaccuracies, which will be specifically referred to as the accompanying description proceeds.

It is among the objects of the present invention to provide a linear flow meter which is characterized by producing results which are accurate to an extent hitherto unknown.

Another object of the present invention is the provision of an extremely accurate device of the class described which is relatively simple and inexpensive to manufacture.

Another object is to provide a fluid flow meter whose readings are essentially a linear function of volume flow rate independent of pressure.

Still another object is the provision of a fluid flow meter possessing a higher degree of linearity of pressure drop with volume flow rate than can be obtained when using other types of linear flow meters (such as the well-known porous plug type) for the same volume.

A further object is to provide a fluid flow meter which is characterized by the aforementioned objectives and which is also easy to protect from clogging by filtration, easy to clean by washing, and possessed of strength and rigidity.

Yet another object is to provide a flow restricting pack for a linear flow meter having a shallow relatively wide elongated passageway as the basic flow channel element.

A still further object is to measure the linear flow of a fluid which includes passing the fluid, whether gaseous or liquid, through one or more parallel or concentric slots occupying a small space and measuring the pressure drop across a portion or all of the length of the said slots, whereby extremely accurate results are obtained with high flow rates. Accordingly, there is measured the pressure drop across flow restrictions in which laminar flow obtains.

Thus, the teachings of the present invention contemplate readings which are primarily a linear function of the viscosity of the fluid and of the volume flow rate, as distinguished from flow meters of the orifice or venturi types wherein the reading is proportional to the product of the density and the square of the volume flow rate.

Importantly, the present invention contemplates employment of a specific structure for the elemental flow channel in the flow restricting pack of the linear flow meter. Forming the elemental flow channel as an unimpeded passageway of a substantially uniform depth in the range of 0.002 to 0.100 inch and of a width at least ten times the depth theoretically and in practice results in a substantial improvement in flow restrictor efficiency over prior art structures.

The present invention, then, comprises the features hereinafter fully described, and as particularly pointed out in the claims, the following description and the annexed drawings set forth in detail certain illustrative embodiments of the invention, these being indicative of but several ways in which the principles of the invention may be employed.

Figure 1:
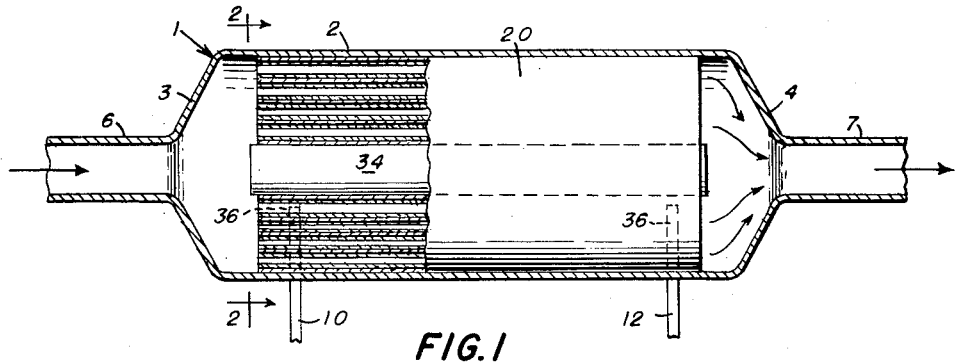
FIGURE 1 is an elevational view, partly in section of a flow meter constructed in accordance with the teachings of the invention.

Referring more particularly to FIGURE 1 of the drawing where flow meter 1 is illustrated, the numeral 2 generally designates a main tubular body portion having reduced ends 3 and 4 which are, in turn, connected with the inlet and outlet connections 6 and 7, respectively, for the fluid whose flow (or viscosity) is to be measured. The leading and trailing pressure taps of the flow meter are indicated at 10 and 12, respectively; the same being shown exemplarily as communicating with the interior of main tubular body portion 2. Taps 10, 12 lead to an indicating instrument which may take any one of a number of well-known forms but which, as such, form no part of the present invention and accordingly is neither shown herein nor specifically referred to hereinafter.

Figure 2:
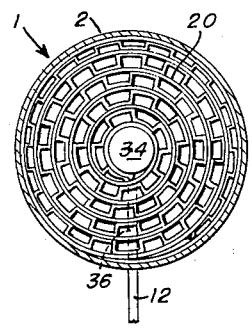
FIGURE 2 is a sectional view on the line 2—2 of FIGURE 1.
Figure 4:
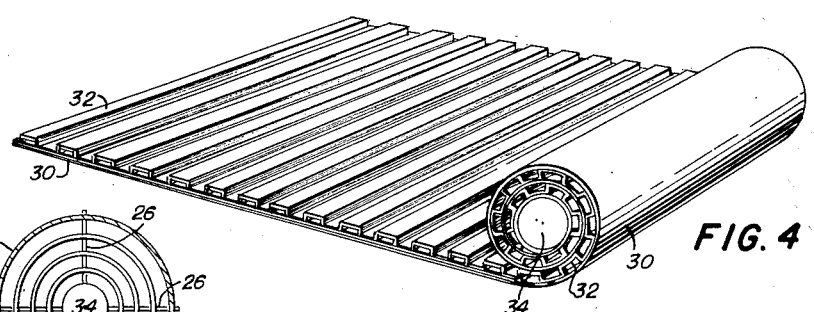
FIGURE 4 is a diagrammatic view showing the structure of the flow restrictor.

Referring to the cross-sectional view of FIGURE 2, the flow element per se shown there is in the form of a spirally wrapped core or pack 20 of the flow restrictor shown in FIGURE 4. Spiral pack 20 provides a multiplicity of parallel unimpeded channels or slots to act as flow paths for laminar flow of fluid through pack 20.

The basic flow restrictor element which is illustrated in FIGURE 4 comprises a smooth flat sheet 30 and rectangularly indented sheet 32 laid together in paired sheets 30, 32 to provide the slots of a thickness far smaller than the width.

The rectangularly indented sheet 32 employed in the modes illustrated in FIGURES 1–4 of the drawing, may be easily and inexpensively producted by rolling through corrugated rolls or by stamping or by any other metal fabricating technique adapted to result in angular indentations having the rectangular wave cross-section shown in the drawings. A rectangular wave form of proper dimension is of critical importance in forming the ultimately desired channel shape and size.

Figure 3:
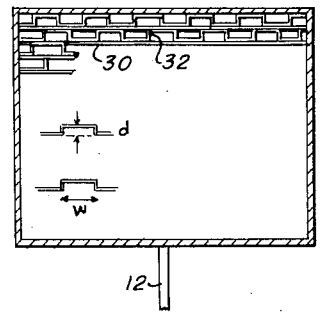
FIGURE 3 is a cross-sectional view of another modified form of flow element.

The paired sheets 30, 32 are spirally wound upon mandrel 34 to a desired diameter restrictor element for assembly as pack 20 inside a flow meter 1. Advantageously, a properly sized mandrel 34 can be used to permit its being left in the completed pack 20 to form a closed arbor longitudinally extending adjacent the axis of the flow meter (as shown in FIGURES 1 and 2). Alternatively, a multiplicity of paired sheets 30, 32 can be laid up in a flat pack to form an oblong flow restrictor such as illustrated in FIGURE 3. The oblong restrictor of FIGURE 3 encased in an oblong body portion can, of course, be secured to oblong fluid inlet and outlet connections similar to the connections 6, 7, 10, 12 of FIGURE 1 to form a complete flow meter. Each channel or slot constitutes an unimpeded passageway of a substantially uniform depth, i.e., 0.002–0.100 inch, and a width at least ten times the depth.

The assembled packs of FIGURES 2 and 3 can be made into an integral unit by laying up a plurality of paired sheets 30, 32, then soldering or otherwise adhering together the various sheets 30, 32 into a unitary whole. Peculiarly enough the spiral form shown in cross-section by FIGURE 2 can be formed into a sufficiently tight pack by the simple expedient of tightly winding a pair of sheets 30, 32 on mandrel 34, then loosening up on the tension slightly to relax the stress so placed upon the ribs of sheet 32 and inserting the pack into a closely fitting housing 2. The ribs left by the indentations on sheet 32 are strong enough to maintain the integrity of spiral pack 20.

Less desirably the paired sheets 30, 32 can be formed into cylinders of different sizes and nested into a series of concentric tubes (not shown). Although contemplated for the practice of the instant invention, such an expedient involves construction problems not present in the spiral or oblong pack.

Figure 5:
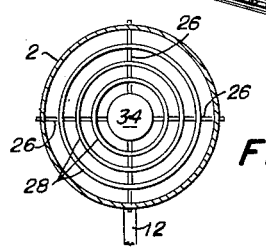
FIGURES 5 and 6 are cross-sectional views of still other forms of flow elements.

More preferable (for small flow meters) is the concentric tube structure illustrated in FIGURE 5 where a plurality of cylinders are held in concentrically spaced apart relation by radial rods 26 within a main tubular body portion 2, the inside diameter of each larger tube being a fixed number larger than the outside diameter of the next smaller tube, thereby providing an array in a small space of concentric slots. Accordingly, each slot so formed has a length equal to the length of the tubes, a thickness equal to the separation between each pair of tubes, and an effective width in the same range of 0.002–0.100 inch which is equal to the mean of the tube circumferences forming the slot. Such an array of concentric tubes may be held in fixed position with respect to each other by sets of small radial rods or wires 26 at each end of the flow pack. The rods are suitably connected to the housing and, if desired, to each tube, e.g., fusing, soldering, welding, brazing, etc.

Figure 6:
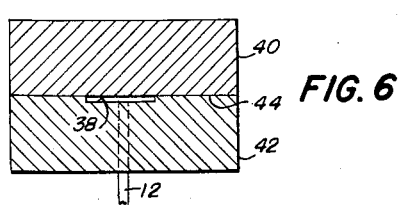

For very low fluid flow rates the single slot mode illustrated in FIGURE 6 has been found practical. One channel or slot 38, rectangular cross-section 0.002–0.100 inch deep, is formed between two plates 40, 42 and suitable tap holes are drilled near the ends of slot 38 for connection to taps, e.g. 12, and then to an indicating instrument (not shown). Desirably the shallow elongated slot 38 is milled entirely out of one plate as illustrated for plate 42, e.g., by machining, chemically milling, etc., and the other plate 40 left smooth, the contacting plate surfaces 44 being, however, machined to provide a close fit. The paired plates 40, 42, which are assembled by gasketing, brazing, soldering, etc., actually need not be provided with a separate external housing other than what may be necessary to connect each end of slot 38 with the flowing fluid being measured. This single slot mode is particularly adapted for accurately measuring low flow rates, e.g., 10 cc. per minute.

Referring back to FIGURE 1, it should be noted that the two taps 10, 12 are shown as having been placed well within the ends of core or pack 20.

Experimentally and theoretically it has been established that for laminar flow through a linear flow meter there is developed a non-linear pressure drop across the entrance, as well as the exit of the flow channel or channels. This non-linear pressure drop is proportional to the product of the fluid density and the square of the volume flow rate and is of much greater magnitude for the entering than for the exiting fluid. In continuing downstream of the channel entrance, it will be found that after a distance equal to a specified number, namely 20 times the depth of the slot, the flow approaches a laminar distribution and remains so until a distance from the exit equal to another factor times the depth of the slot, at which point the exit non-linearity is apparent. It will also be found that if the pressure pipes or taps 10 and 12 are both disposed within the truly laminar flow region, the pressure drop across these taps is proportional to the mean volume flow rate between these taps to a very high degree of linearity. If the taps are both placed outside the flow restricting pack as can well be done, the pack must, however, be made relatively long in order to have the linear pressure drop portion swamp out the effect of the non-linearities at the ends thereof. This is usually not practical for commercial work in which the shortest and most compact design as well as the minimum pressure drop is desired.

However, since the exit non-linearity is fortunately but a small factor compared to the entrance non-linearity, it is possible should the occasion demand to place the downstream tap outside of the pack and still maintain a relatively good overall linearity in a compact flow meter. Accordingly the instant invention also contemplates placement of the upstream tap within the pack and the downstream tap outside of the pack.

In order to improve the time response of such a flow meter, it is important that the taps be permitted to communicate with as large a volume of the flowing fluid as possible. This is attained by providing communicating holes 36, as shown in FIGURE 1, between flow channels in the same transverse plane as the pressure taps. In the event a sudden flow is established, a portion of the fluid must be diverted into the pressure measuring device until a pressure balance is attained. The presence of the communicating holes 36 permits a large volume of fluid to flow in the direction of the pressure pipes or taps (10 and 12) so that the time required to fill the pressure measuring device (not shown) is materially reduced. Consequently, the time response of the linear flow meter of the instant invention, whether having one or both of its pressure taps inside the flow restricting pack, may be materially improved by providing communicating holes 36 between many, but not necessarily all, the individual flow channels, the holes being disposed in the planes normal to the longitudinal axis of the flow meter and intersecting the axes of the pressure pipes or taps 10 and 12.

As has been indicated the ultimate channel should be properly dimensioned and proportioned as a wide unimpeded slot of a substantially uniform depth. Thus $d$, the depth, should be in the range of 0.002–0.100 inch. Smaller depths than 0.002 allow dust particles to clog the channel passageway while larger depths than 0.100 have so little restriction as to be worthless for producing a pressure drop. Similarly the $w/d$ ratio should exceed 10 to 1. Suitably 0.001″ sheet (A1) indented to a $d$ of 0.005 and a $w$ of 0.075″ paired with a smooth sheet, also 0.001″ A1, forms a satisfactory spiral pack 20 or oblong pack. The concentric tube mode of FIGURE 5 which has a $w$ equal to the circular circumference and a $d$ equal to the annular distance between tubes 28, constitutes a special case of the shallow but wide slot. As will be demonstrated hereinafter, both these flow channels are superior to other geometric shapes.

The flattened rectangular or annular segment form is of critical importance. This particular shape is demonstrably fifty percent more efficient than a comparable circular shape, and over three times as efficient as a comparable equilateral triangle shape. Thus the well known equations for steady state laminar flow are:

(1) $$\frac{dp}{dl} = \frac{\gamma}{m}\left(\frac{1}{2}\rho v_m^2\right)$$

where $\gamma$ is a non-dimensional resistance coefficient, $\rho$ is the density of the fluid, $v_m$ is the mean velocity in the channel, and $m$ is the hydraulic radius defined as (2) $$m = \frac{\text{channel area}}{\text{channel perimeter}} = \frac{A}{L}$$

Experimentally it has been found that flow through the channel may be characterized by the non-dimensional parameter known as the Reynold's number where (3) $$R = \frac{4m\rho v_m}{\mu}$$

where $\mu$ is the fluid viscosity; the Reynold's number expresses the ratio of the inertia forces to the viscous forces in the fluid. For low values of R, the viscous forces predominate and the flow is laminar while for high values of R the inertia forces predominate and the flow is turbulent. The resistance coefficient $\gamma$ is found to be a function of the Reynold's number. Thus in flow through a circular channel for $R<2100$ the flow is laminar, while for $R>2100$ it tends to a turbulent flow. The transition occurs at $R=2100$, and it is interesting to note that this transition also occurs in the range: $R=1600$ to $2800$ for channels of annular, rectangular and square cross sections.

In any of these cases the resistance coefficient $\gamma$, over the laminar flow range, can be shown to be given by $$(4) \quad \gamma = \frac{C}{R}$$

where $C$ is a constant. Upon combining Equations 1, 2, 3 and 4, there is obtained for laminar flow $$(5) \quad \frac{dp}{dl} = \left(\frac{CL^2}{8A^2}\right)\mu v_m = K_1 \mu v_m$$

This is the fundamental equation which expresses the linearity of the pressure gradient with the volumetric flow in the channel.

From the foregoing Equations 1–5, the optimum slot can be determined among the following cases:

I. Cylinder of radius $a$
II. Annulus of inside radius $b$ and outside radius $a$
III. Thin annulus of outside radius $a$ and thickness $t$ where $t \ll a$
IV. Thin rectangular slot of thickness $t$ and width $w$ where $t \ll w$
V. Equilateral triangle of side length $a$ The following table compares the K factor, the Reynold's number for each of the above slot configuration, and the pressure drop $$\frac{dp}{dl}$$

under specific conditions set out below.

| Case No. | $K_1$ | $R$ | $\frac{dp}{dl}$ |
|---|---|---|---|
| I [1] | $\frac{8}{a^2}$ | $\frac{2\rho a v_m}{\mu}$ | $\frac{32\rho^2 v_m^3}{\mu R^2}$ |
| II [1] | $\frac{8}{a^2+b^2+(a^2-b^2)/\log\frac{b}{a}}$ | $\frac{2\rho(a-b)v_m}{\mu}$ | |
| III | $\frac{12}{t^2}$ | $\frac{2\rho t v_m}{\mu}$ | $\frac{48\rho^2 v_m^3}{\mu R^2}$ |
| IV [1] | $\frac{12}{t^2}$ | $\frac{2\rho t v_m}{\mu}$ | $\frac{48\rho^2 v_m^3}{\mu R^2}$ |
| V [2] | $\frac{40}{a^2}$ | $\frac{\rho a v_m}{\sqrt{3}\mu}$ | $\frac{13\frac{1}{3}\rho^2 v_m^3}{\mu R^2}$ |

[1] Hydrodynamics 6th Ed. by Lamb, Dover Pub., New York, pp. 582, 585, 587.
[2] Theoretical Hydrodynamics by Milne-Thompson, MacMillan & Co., Ltd., London, pp. 249, 517.

Since the mean velocity $v_m$ is numerically equal to the volumetric flow per unit area, assigning the same velocity value to each flow channel permits a direct comparison of efficiency between the different channels. Solving the expression of $R$, the Reynold's number, for the geometric parameters $a$, $t$, $b$, permits the elimination of these parameters from the expression for $K_1$ in the table. The table listing for the value $dp/dl$ is therefore a direct comparison of the relative efficiency of the slot configurations. It is clear therefore that the thin annular slot and the thin rectangular slot (FIGURES 4, 5) is 1½ times as efficient as the cylinder and about 3½ times as efficient as the equilateral triangle and is therefore to be preferred for laminar flow fluid flow meters.

While I have shown and described certain specific embodiments of the present invention, it will be readily understood by those skilled in the art that I do not wish to be limited exactly thereto, since various modifications may be made without departing from the scope of the invention as defined in the appended claims.

This application is a continuation-in-part of S.N. 345,991 filed March 31, 1953, now abandoned.

What is claimed is:

1. A fluid restrictor for linear flow meters comprising an elongated housing having a fluid entranceway and a fluid exit passage at the ends thereof, a pair of spaced apart pressure taps positioned on said housing intermediate the ends thereof adapted for connection to an indicating instrument, and an elongated flow restricting pack inside said housing between said taps, said flow restricting pack further comprising at least one substantially unimpeded flow channel exhibiting in cross-section a generally rectangular shape, said rectangular shape having substantially uniform channel depth ranging from 0.002–0.100″ and width at least ten times the depth.

2. The fluid restrictor of claim 1 wherein the upstream tap is positioned to communicate directly with the interior of said flow restricting pack by placement on the housing at a location downstream of the entrance to said pack equal to at least 20 times the average channel depth.

3. The fluid restrictor of claim 1 wherein said flow restricting pack further comprises a spirally wound plurality of elongate channels originally rectangular in cross-section, whereby each said flow channel of the spiral wound pack actually constitutes a segment of an annulus.

4. The fluid restrictor of claim 1 wherein said flow restricting pack further comprises a plurality of channels, the cross-sectional shape of each flow channel being an elongated rectangle, and wherein the upstream tap is positioned to communicate directly with the interior of said flow restricting pack by placement on the housing at a location downstream of the entrance to said channels equal to at least 20 times the average channel depth and wherein a hole leading from said tap pierces at least partway through said pack whereby said plurality of flow channels are in direct communication with said tap.

5. The fluid restrictor of claim 1 wherein the flow restricting pack comprising as the basic elements thereof, a flat sheet and a formed sheet indented with elongated slots of a cross-section resembling a rectangular wave form, the sheets being paired together into a multi-layer pack so that each indented sheet is sandwiched between flat sheets, whereby a multiplicity of properly shaped elongated rectangular slots traverse the length of the pack in substantially unobstructed flow channels.

6. The fluid restrictor of claim 5 wherein the flow restricting pack constitutes one pair of said sheets spirally wrapped around an arbor closed to the flow of fluid therethrough.

7. The fluid restrictor of claim 5 wherein the flow restricting pack constitutes a plurality of such sheet pairs assembled together into an oblong block.

8. A fluid restrictor for linear flow meters comprising an elongated housing defining a chamber, a longitudinally extending arbor disposed in said housing adjacent its axis, said arbor being closed to the flow of fluids therethrough, an array of flow confining elements disposed radially of said arbor, spaced apart a uniform depth ranging from 0.002–0.100″, means for so spacing said elements with respect to each other and to said elongated housing thereby providing a plurality of shallow flow paths, and upstream and downstream taps extending into said elongated housing and, respectively communicating with the upstream and downstream ends of said array of flow confining elements, said upstream tap being positioned to communicate directly with the interior of said flow confining elements by placement on the housing at a location downstream of the entrance to said elements equal to at least 20 times the average spacing distance between elements.

9. The fluid restrictor of claim 8 wherein a radial passageway piercing said array of flow confining elements interconnects a plurality of flow paths with said upstream tap.

10. A fluid restrictor for linear flow meters comprising an elongated housing defining a chamber, longitudinally extending arbor disposed in said housing adjacent its axis, said arbor being closed to the flow of fluid therethrough, a series of progressively larger tubes disposed concentrically about said arbor spaced apart a uniform annular distance ranging from 0.002–0.100″, means for so spacing said tubes with respect to each other and to said elongated housing thereby providing a plurality of shallow annular flow paths, and upstream and downstream taps extending into said elongated housing and respectively communicating with the upstream and downstream ends of the concentric tubes, the upstream tap being positioned to communicate directly with the interior of the concentric tubes by placement on the housing at a location downstream of the entrance to said tubes equal to at least 20 times the average spacing distance between said tubes.

11. The fluid restrictor of claim 10 wherein a hole leading from said tap radially pierces at least partway through said pack whereby a plurality of flow channels are in direct communication with said tap.

References Cited in the file of this patent

UNITED STATES PATENTS

| | | |
|---|---|---|
| 1,677,811 | Bowen | July 17, 1928 |
| 2,132,011 | Bennett et al. | Oct. 4, 1938 |
| 2,163,730 | Goetzl | June 27, 1939 |
| 2,196,519 | Budwig | Apr. 9, 1940 |
| 2,212,186 | Ricardo et al. | Aug. 20, 1940 |
| 2,364,602 | Comer et al. | Dec. 12, 1944 |
| 2,497,978 | Carlson | Feb. 21, 1950 |
| 2,602,645 | Benenati et al. | July 8, 1952 |
| 2,876,800 | Kalff | Mar. 10, 1959 |
| 2,953,167 | Smith et al. | Sept. 20, 1960 |